United States Patent [19]

Yokoyama

[11] Patent Number: 5,557,661
[45] Date of Patent: Sep. 17, 1996

[54] SYSTEM FOR CODING AND DECODING MOVING PICTURES BASED ON THE RESULT OF SPEECH ANALYSIS

[75] Inventor: Yutaka Yokoyama, Tokyo, Japan

[73] Assignee: NEC Corporation, Japan

[21] Appl. No.: 329,331

[22] Filed: Oct. 26, 1994

[30] Foreign Application Priority Data

Nov. 2, 1993 [JP] Japan .................. 5-274219

[51] Int. Cl.$^6$ ............................. H04M 11/00
[52] U.S. Cl. .................................. 379/96; 348/19
[58] Field of Search ............... 348/14–20; 379/52, 379/93, 96–100; 381/48, 43

[56] References Cited

U.S. PATENT DOCUMENTS 5,313,522 5/1994 Slager ........................ 379/52

FOREIGN PATENT DOCUMENTS

| | | | |
|---|---|---|---|
| 62-274962 | 11/1987 | Japan | 379/53 |
| 60-20983 | 1/1988 | Japan | 379/53 |
| 2-36687 | 2/1990 | Japan . | |
| WO86/010160 | 2/1986 | WIPO | 379/100 |

OTHER PUBLICATIONS

"Speech Recognition", Digital Speech Processing, the Publishing Society of Tokai University, 1985, pp. 149–192.
"Coding for Communications" and Moving Picture Coding Standards, International Standards for Multi–Media Coding, Maruzen Kabushiki Kaisha, 1991, pp. 84–102.
"High Efficiency Coding of Speech" and Acoustic Speech Coding Standards, International Standards for Multi–Media Coding, Maruzen Kabushiki Kaisha, 1991, pp. 179–190.
"Speech Recognition by Machine: A Review"; Proceedings of the IEEE; Vol. 64, No. 4; Apr. 1976; D. Raj Reddy; pp. 501–531.
"Automatic Recognition of Speakers from Their Voices"; Proceedings of the IEEE; vol. 64, No. 4; Apr. 1976; Bishnu S. Atal; pp. 460–475.
"Line Transmission of Non–Telephone Signals—Video CODEC for Audiovisual Services at px64 kbits"; International Telecommunication Union; ITU–T Telecommunication Standardization Sector of ITU; ITU–T Recommendation H.261 (Previously CCIT Recommendation); Mar. 1993.
"General Aspects of Digital Transmission Systems; Terminal Equipments—Coding of Speech at 16 kbit/s Using Low–Delay Code Excited Linear Prediction"; International Telecommunication Union; CCITT The International Telegraph and Telephone Consultative Committee; Recommendation G.728; Geneva 1992; Sep. 1992.

*Primary Examiner*—Wing F. Chan
*Attorney, Agent, or Firm*—Ostrolenk, Faber, Gerb & Soffen, LLP

[57] ABSTRACT

A speech and moving picture coding and decoding system wherein pictures which are close to real pictures and look more natural than ever are displayed by a simple method without the necessity of complicated processing for picture analysis or picture synthesis and pictures which look like pictures in a real speaking condition can be decoded and reproduced with high picture quality even where the transmission capacity is restricted low is disclosed. On the transmission side, input speech is coded while it is simultaneously analyzed by a speech analysis section, and an input picture corresponding to a result of the speech recognition is coded by a picture coding section and transmitted. On the reception side, the coded picture is decoded and stored into a picture memory. Then, the coded speech received is decoded by a speech decoding section, and one of stored pictures corresponding to the received result of speech recognition is read out from the picture memory.

8 Claims, 5 Drawing Sheets

TRANSMISSION SIDE | RECEPTION SIDE

SYSTEM FOR CODING AND DECODING MOVING PICTURES BASED ON THE RESULT OF SPEECH ANALYSIS

BACKGROUND OF THE INVENTION

1. Field of the Invention

This invention relates to a coding and decoding system for moving pictures (particularly of the face) wherein a small number of moving pictures are stored on the reception side and one of them is selectively displayed in accordance with speech information transmitted thereto, and more particularly to a speech and moving picture coding and decoding system of the type mentioned which makes use of a telecommunication line of a low bit rate.

2. Description of the Related Art

A video phone which makes use of a public telephone line is one of speech and picture communication means which make use of communication lines of a low bit rate. The video phone, however, is applied only to transmit a still picture and cannot reproduce natural moving pictures.

Another system is disclosed in Japanese Patent Application No. Helsei 2-36687 wherein a still picture is transmitted upon initialization and a moving picture of the face is synthesized in response to subsequently received speech information by using the initial still picture data received upon initialization by the reception side. The system which synthesizes a picture, however, requires means for complicated picture analysis and picture synthesization, which requires a high cost to realize the system.

SUMMARY OF THE INVENTION

It is an object of the present invention to provide a speech and moving picture coding and decoding system wherein pictures which are close to real pictures and look more natural than ever are displayed by a simple method without the necessity of complicated processing for picture analysis or picture synthesis.

It is another object of the present invention to provide a speech and moving picture coding and decoding system wherein pictures which look like pictures in a real speaking condition can be decoded and reproduced with high picture quality even where the transmission capacity is restricted low.

In order to attain the objects described above, according to a first aspect of the present invention, there is provided a speech and moving picture coding and decoding system, which comprises a transmission side apparatus for coding speech and a picture and transmitting the thus coded speech and picture, and a reception side apparatus for receiving and decoding the coded speech and the coded picture from the transmission side apparatus, the transmission side apparatus including speech coding means for coding input speech and outputting the thus coded speech data to the reception side apparatus, speech analysis means for analyzing the input speech to recognize an utterance condition of a sound among a finite number of sounds and outputting a result of the speech recognition and for generating a control signal when coded data of an input picture corresponding to the result of the input picture have not been received by the reception side apparatus as yet, and picture coding means for coding an input picture to obtain coded picture data and outputting the coded picture data to the reception side apparatus when the control signal is received from the speech analysis means, the reception side apparatus including speech decoding means for decoding coded speech data received from the transmission side apparatus into decoded speech and outputting the decoded speech, picture decoding means for receiving and decoding coded picture data from the transmission side apparatus into a decoded picture and outputting the decoded picture, and picture storage means for storing decoded pictures from the picture decoding means and selectively outputting, when a result of speech recognition is received from the speech analysis means of the transmission side apparatus, one of the stored decoded pictures corresponding to the result of speech recognition.

The speech analysis means of the transmission side apparatus may include a history storage section for storing transmission history information of coded data of input pictures corresponding to results of speech recognition. In this instance, each time an initialization signal is received, the speech analysis means of the transmission side apparatus may initialize the transmission history information of the history storage section and update the picture data stored in the picture storage means of the reception side apparatus.

Alternatively, the speech analysis means of the transmission side apparatus may include an initialization operation control section for causing picture data corresponding to all of the utterance conditions recognizable by a speech analysis to be stored into the picture storage means of the reception side apparatus as an initialization operation before starting of communication of any coded data. In this instance, the speech analysis means of the transmission side apparatus may update the picture data stored in the picture storage means of the reception side apparatus by way of the initialization operation control section each time an initialization signal is received.

In the speech and moving picture coding and decoding system, an uttered condition of each sound among a finite number of sounds is recognized by a result of a speech analysis, and characteristic moving pictures individually corresponding to such conditions are selectively coded and transmitted to the reception side apparatus and stored into the picture storage means. Then, during subsequent communication, in response to a result of recognition of input speech, one of the stored pictures which most resembles to the result of recognition is selected and displayed.

With the speech and moving picture coding and decoding system, since a picture corresponding to input picture is selectively displayed, a picture which looks like a picture in an actually uttered condition can be decoded and reproduced with high picture quality. Further, during communication, only speech data are transmitted in most cases, and consequently, the amount of transmission codes is small. Accordingly, the speech and moving picture coding and decoding system can be applied also to speech and picture communications which make use of communication lines of a low bit rate. Moreover, where the picture data are updated suitably, even if an original picture exhibits a variation other than a variation in utterance, a picture close to the original picture can be reproduced.

Further, since input speech is analyzed and a result of such speech recognition is transmitted, an input picture corresponding to the result of analysis can be reproduced. In addition, since the speech analysis means is provided on the transmission side apparatus, the scale of the reception side apparatus can be reduced as much.

According to a second aspect of the present invention, there is provided a speech and moving picture coding and decoding system, which comprises a transmission side apparatus for coding speech and a picture and transmitting the thus coded speech and picture, and a reception side apparatus for receiving and decoding the coded speech and the coded picture from the transmission side apparatus, the transmission side apparatus including speech coding means for coding input speech and outputting the thus coded speech data to the reception side apparatus, and picture coding means for coding an input picture to obtain coded picture data and outputting the coded picture data to the reception side apparatus when a control signal is received from the reception side apparatus, the reception side apparatus including picture decoding means for receiving and decoding coded picture data from the transmission side apparatus into a decoded picture and outputting the decoded picture, speech decoding means for decoding coded speech data received from the transmission side apparatus into decoded speech and outputting the decoded speech, speech analysis means for analyzing the decoded speech from the speech decoding means to recognize an utterance condition of a sound among a finite number of sounds and outputting a result of the speech recognition and for generating and outputting a control signal to the transmission side apparatus when coded data of an input picture to the transmission side apparatus corresponding to the result of the speech recognition have not been received by the reception side apparatus as yet, and picture storage means for storing decoded pictures from the picture decoding means and selectively outputting one of the stored decoded pictures corresponding to the result of speech recognition when the result of speech recognition is received from the speech analysis means.

The speech analysis means of the reception side apparatus may include a history storage section for storing reception history information of coded data of input pictures corresponding to results of speech recognition. In this instance, each time an initialization signal is received, the speech analysis means of the reception side apparatus may initialize the reception history information of the history storage section and update the picture data stored in the picture storage means of the reception side apparatus.

Alternatively, the speech analysis means of the reception side apparatus may include an initialization operation control section for causing picture data corresponding to all of the utterance conditions recognizable by a speech analysis to be stored into the picture storage means of the reception side apparatus as an initialization operation before starting of communication of any coded data. In this instance, the speech analysis means of the reception side apparatus may update the picture data stored in the picture storage means of the reception side apparatus by way of the initialization operation control section each time an initialization signal is received.

Also in the speech and moving picture coding and decoding system, an uttered condition of each sound among a finite number of sounds is recognized by a result of a speech analysis, and characteristic moving pictures individually corresponding to such conditions are selectively coded and transmitted to the reception side apparatus and stored into the picture storage means. Then, during subsequent communication, in response to a result of recognition of input speech, one of the stored pictures which most resembles to the result of recognition is selected and displayed.

Accordingly, also with the speech and moving picture coding and decoding system, since a picture corresponding to input picture is selectively displayed, a picture which looks like a picture in an actually uttered condition can be decoded and reproduced with high picture quality. Further, during communication, only speech data are transmitted in most cases, and consequently, the amount of transmission codes is small. Accordingly, the speech and moving picture coding and decoding system can be applied also to speech and picture communications which make use of communication lines of a low bit rate. Moreover, where the picture data are updated suitably, even if an original picture exhibits a variation other than a variation in utterance, a picture close to the original picture can be reproduced.

Further, since the speech analysis means is provided on the reception side apparatus, the scale of the transmission side apparatus can be reduced as much. In addition, when it is tried to achieve bidirectional communications by way of a combination with the system of the first aspect of the present invention described above, the speech analysis means may be provided on one of the transmission side apparatus and the reception side apparatus, and in this instance, the other side apparatus can be constructed in a reduced scale.

According to a third aspect of the present invention, there is provided a speech and moving picture coding and decoding system, which comprises a transmission side apparatus for coding speech and a picture and transmitting the thus coded speech and picture, and a reception side apparatus for receiving and decoding the coded speech and the coded picture from the transmission side apparatus, the transmission side apparatus including speech coding means for coding input speech and outputting the thus coded speech data to the reception side apparatus, transmission side speech analysis means for analyzing the input speech to recognize an utterance condition of a sound among a finite number of sounds and for generating a control signal when coded data of an input picture corresponding to the result of the speech recognition have not been received by the reception side apparatus as yet, and picture coding means for coding an input picture to obtain coded picture data and outputting the coded picture data to the reception side apparatus when the control signal is received from the transmission side speech analysis means, the reception side apparatus including picture decoding means for receiving and decoding coded picture data from the transmission side apparatus into a decoded picture and outputting the decoded picture, speech decoding means for decoding coded speech data received from the transmission side apparatus into decoded speech and outputting the decoded speech, reception side speech analysis means for analyzing the decoded speech from the speech decoding means to recognize an utterance condition of a sound among a finite number of sounds and outputting a result of the speech recognition, and picture storage means for storing decoded pictures from the picture decoding means and selectively outputting one of the stored decoded pictures corresponding to the result of speech recognition from the reception side speech analysis means.

The speech analysis means of the transmission side apparatus may include a history storage section for storing transmission history information of coded data of input pictures corresponding to results of speech recognition. In this instance, the speech analysis means of the transmission side apparatus may initialize, each time an initialization signal is received, the transmission history information of the history storage section and updates the picture data stored in the picture storage means of the reception side apparatus.

Alternatively, the speech analysis means of the transmission side apparatus may include an initialization operation control section for causing picture data corresponding to all of the utterance conditions recognizable by a speech analysis to be stored into the picture storage means of the reception side apparatus as an initialization operation before starting of communication of any coded data. In this instance, the speech analysis means of the transmission side apparatus may update the picture data stored in the picture storage means of the reception side apparatus by way of the initialization operation control section each time an initialization signal is received.

Also in the speech and moving picture coding and decoding system, an uttered condition of each sound among a finite number of sounds is recognized by a result of a speech analysis, and characteristic moving pictures individually corresponding to such conditions are selectively coded and transmitted to the reception side apparatus and stored into the picture storage means. Then, during subsequent communication, in response to a result of recognition of input speech, one of the stored pictures which most resembles to the result of recognition is selected and displayed.

Accordingly, also with the speech and moving picture coding and decoding system, since a picture corresponding to input picture is selectively displayed, a picture which looks like a picture in an actually uttered condition can be decoded and reproduced with high picture quality. Further, during communication, only speech data are transmitted in most cases, and consequently, the amount of transmission codes is small. Accordingly, the speech and moving picture coding and decoding system can be applied also to speech and picture communications which make use of communication lines of a low bit rate. Moreover, where the picture data are updated suitably, even if an original picture exhibits a variation other than a variation in utterance, a picture close to the original picture can be reproduced.

Further, since the speech analysis means is provided on both of the transmission side apparatus and the reception side apparatus, although the scale of each of the transmission side apparatus and the reception side apparatus is large, there is no need of communicating a result of speech recognition between the transmission side apparatus and the reception side apparatus, and consequently, the communication cost can be reduced.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
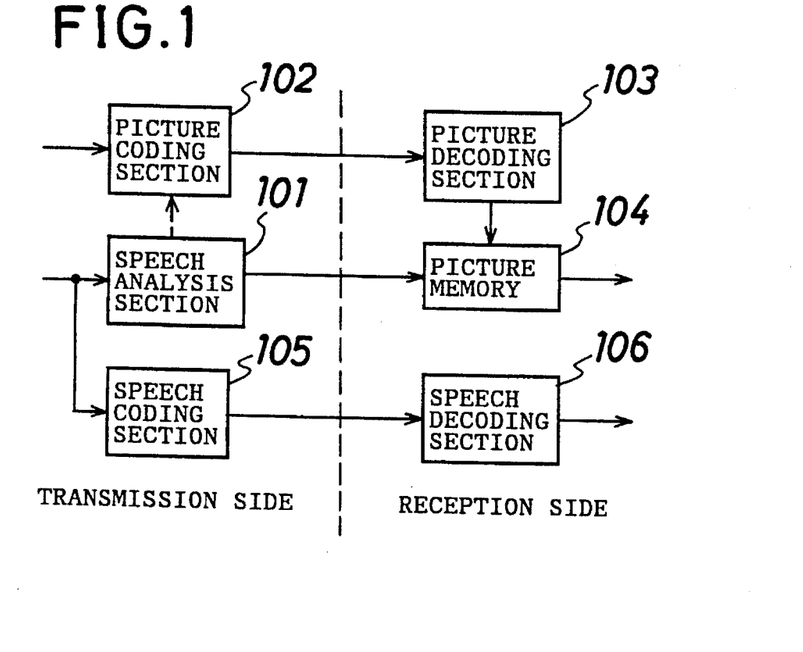
FIG. 1 is a block diagram of a speech and moving picture coding and decoding system showing a first preferred embodiment of the present invention.

Referring first to FIG. 1, there is shown a speech and moving picture coding and decoding system to which the present invention is applied. The speech and moving picture coding and decoding system recognizes, by way of an example, utterance of sounds of the five vowels of the Japanese language, that is, "a", "i", "u", "e" and "o" and a no-utterance condition from speech of a speaker and uses individual pictures corresponding to the conditions. This applies also to the other speech and moving picture coding and decoding systems of different embodiments hereinafter described.

The speech and moving picture coding and decoding system includes a transmission side apparatus which includes a speech analysis section 101 for analyzing input speech to recognize a limited number of utterance conditions including presence or absence of uttered sound and uttered sounds of the five vowels of the Japanese language and outputting a result of the recognition, a picture coding section 102 for coding an input picture to obtain coded picture data and outputting the coded picture data to the reception side, and a speech coding section 105 for coding input speech to obtain coded speech data and outputting the coded speech data to the reception side. The speech and moving picture coding and decoding system further includes a reception side apparatus which includes a picture decoding section 103 for receiving and decoding coded picture data, a picture memory 104 for storing decoded pictures from the picture decoding section 103 and selectively outputting one of the stored pictures in response to a result of speech recognition, and a speech decoding section 106 for receiving and decoding coded speech data.

Figure 4:
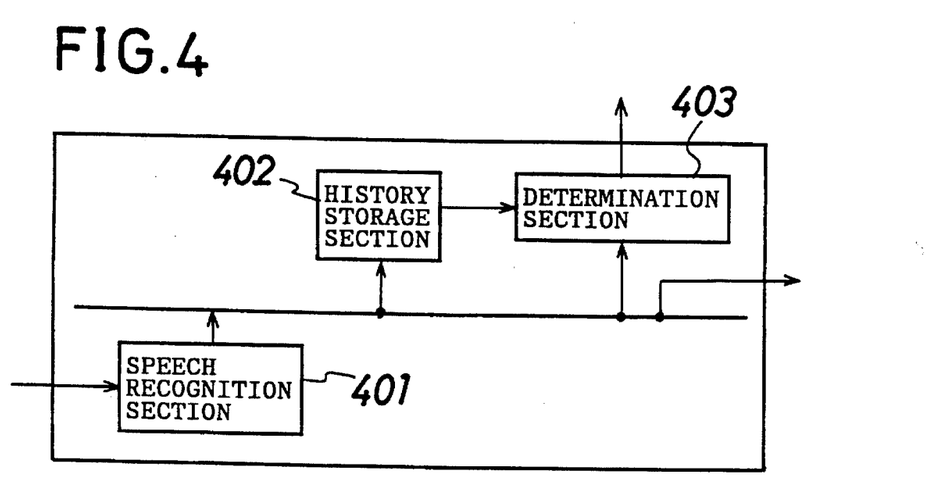
FIGS. 4 to 7 are block diagrams showing different constructions of a speech analysis section in the speech and moving picture coding and decoding systems of FIGS. 1 to 3.

One of several possible constructions of the speech analysis section 101 is shown in FIG. 4. Referring to FIG. 4, the speech analysis section 101 includes a speech recognition section 401, a history storage section 402 and a determination section 403. The speech recognition section 401 recognizes an utterance condition of input speech and outputs a result of the speech recognition. The history storage section 402 stores information of whether or not an input picture corresponding to recognized speech has been coded and transmitted to the reception side. The history storage section 402 has an initial condition in which it stores the information that no input picture has been coded or transmitted. The determination section 403 receives a result of speech recognition from the speech recognition section 401, refers to history information from the history storage section 402, determines whether or not an input picture corresponding to the result of the speech recognition has been transmitted to the reception side, and generates a control signal if the input picture has not been transmitted yet, but does not generate any control information if the input picture has been transmitted already. Further, in the latter case, the determination section 403 updates the stored condition of the history storage section 402 so that the history storage section 402 stores the information that the input picture corresponding to the recognized speech has been transmitted. The result of the speech recognition is outputted to the picture memory 104 on the reception side, by which It is later used as an identifier for a registered picture.

Referring back to FIG. 1, in operation, input speech inputted to the transmission side apparatus is coded by the speech coding section 105, from which resulted coded speech data are outputted to the reception side.

Meanwhile, presence or absence of utterance of a sound of the input speech is recognized by the speech analysis section 101, and when presence of utterance is recognized, it is further recognized by the speech analysis section 101 which one of the five vowels the vowel of the uttered sound is. A result of the recognition is outputted from the speech analysis section 101 to the reception side. Further, if the picture corresponding to the result of recognition has not yet been transmitted to and stored into the picture memory 104 on the reception side, the speech analysis section 101 outputs a control signal. As the method of recognition of speech in this instance, for example, a method discussed in the chapter 8, "Speech Recognition" of "Digital Speech Processing", the Publishing Society of Tokai University, 1985, pp. 149–192, may be employed.

An input picture is coded by the picture coding section 102. The resulted coded picture data are transmitted to the reception side only when a control signal is received from the speech analysis section 101, but are not transmitted in any other case. For example, when the sound "a" is recognized, if the recognition is the first time recognition of "a", since coded picture data corresponding to "a" have not been transmitted to the reception side as yet, the coded picture data are transmitted to the reception side. Otherwise if the recognition is the second or following time recognition, then since picture data corresponding to "a" have been transmitted already, the coded picture data are not transmitted.

On the other hand, on the reception side, the coded speech data are first received and decoded by the speech decoding section 106, from which resulted speech is outputted. When coded picture data are transmitted from the transmission side to the reception side, they are decoded by the picture decoding section 103 to produce a decoded picture. The decoded picture is stored into the picture memory 104 as a picture which corresponds to a result of speech recognition simultaneously transmitted to the reception side apparatus.

Further, in order to obtain a picture output on the output side, when a result of speech recognition is received, a picture corresponding to the result of speech recognition is selected from within stored pictures of the picture memory 104 and outputted. For example, when speech recognition result data representing recognition of "a" as a result of speech analysis are received, picture data which are stored already in the picture memory 104 and originate from utterance of "a" are recalled and displayed.

Conventional known methods may be employed for the methods for coding and decoding a picture and for coding and decoding speech described above. For example, for the coding and decoding of a picture, a method discussed in the section 4, "Coding for Communications" in the chapter 2, "Moving Picture Coding Standards" of "International Standards for Multi-Media Coding", Maruzen Kabushiki Kaisha, 1991, pp. 84–102 (method conforming to the CCITT Recommendations H.261) can be employed.

Meanwhile, for the coding and decoding of speech, a method discussed in the section 8, "High Efficiency Coding of Speech" in the chapter 3, "Acoustic Speech Coding Standards" of the same document, pp. 179–190.

Figure 5:
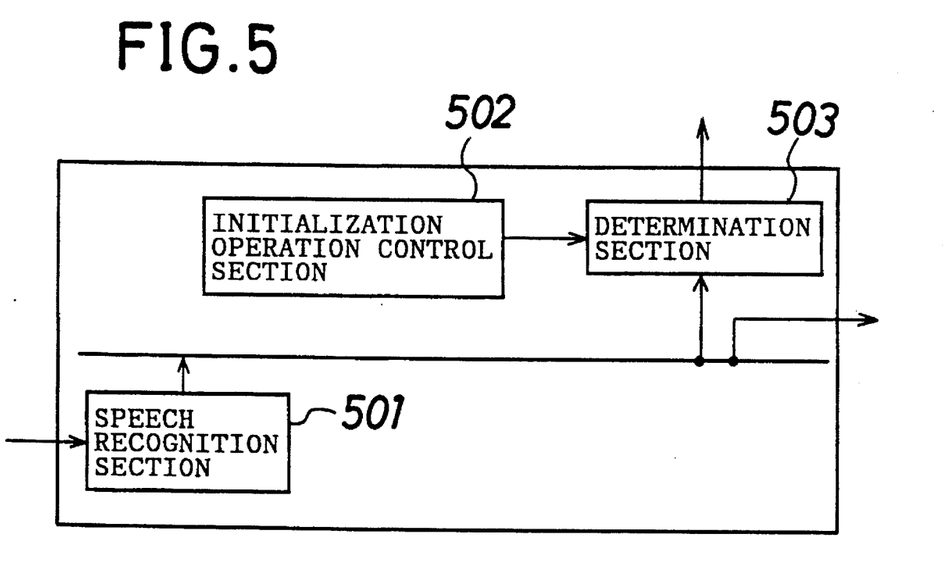

In the speech and moving picture coding and decoding system of the first embodiment, storage of pictures corresponding to all conditions recognized by a speech analysis can be performed as an initialization operation in advance before starting of communication. For example, before starting of communication, operations for all utterance conditions to be recognized are performed and input pictures individually corresponding to the conditions are coded, and then the thus coded input pictures are transmitted to and decoded by the reception side and the thus decoded pictures are stored into a memory. In this instance, the speech analysis section 101 is constituted from, as shown in FIG. 5, a speech recognition section 501, an initialization operation section 502 and a determination section 503, different from the speech analysis section of the construction shown in FIG. 4. In the speech analysis section of the construction shown in FIG. 5, an initialization operation for registering pictures proceeds in the following manner.

Referring to FIGS. 1 and 5, the initialization operation section 502 first instructs an operator to successively utter sounds of speech to be registered. The speech recognition section 501 analyzes input speech inputted in response to the instruction to recognize a condition of an uttered sound and outputs a result of the speech recognition. Then, the determination section 503 determines whether or not the thus recognized sound is to be registered. If the result of determination proves that the recognized sound is to be registered, then the determination section 503 generates a control signal to transmit a corresponding input picture. The result of speech recognition is outputted to the picture memory 104 on the reception side and is thereafter used as an identifier for a registered picture. Thereafter, registration of a next sound is repeated in a similar manner until there remains no sound to be registered any more. Accordingly, the speech recognition section 501 shown in FIG. 5 is not required to store the history and does not require the history storage section 402 shown in FIG. 4.

Or, in the system of the first embodiment, stored picture data may be replaced at each certain interval. For example, a certain interval of time is measured and an initialization signal is generated after each predetermined interval of time to initialize information of whether or not coded picture data corresponding to a result of recognition have been transmitted. Consequently, even if picture data corresponding to a result of speech recognition have been transmitted once in the past, a new picture corresponding to the sound is coded and transmitted again, and accordingly, picture data on the reception side are replaced with the new picture data. In this instance, the speech analysis section 101 is constructed in such a manner as shown in FIG. 6.

Figure 6:
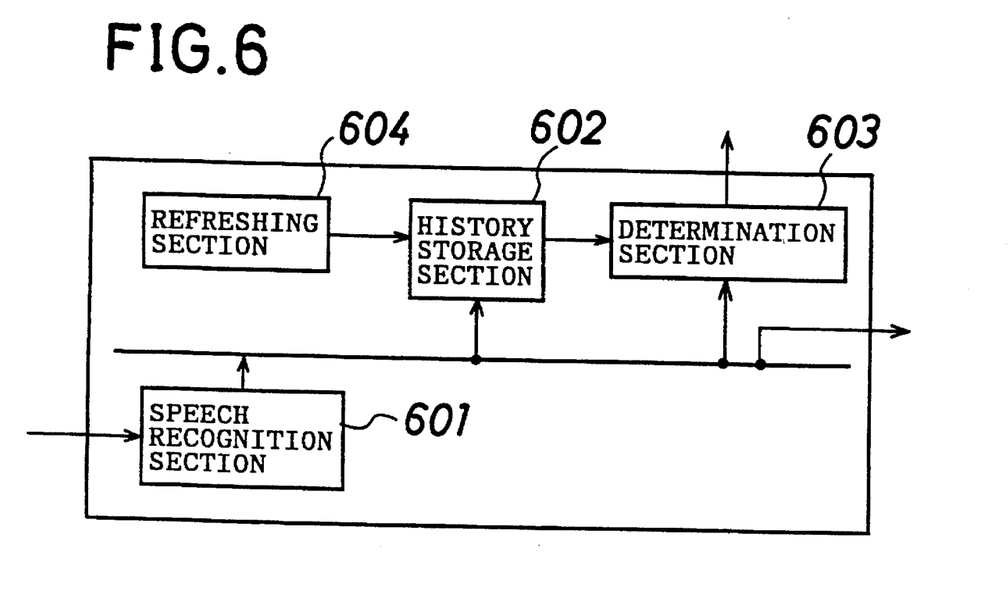

Referring to FIG. 6, the speech analysis section 101 shown includes a speech recognition section 601, a history storage section 602, a determination section 603 and a refreshing section 604. The speech recognition section 601 recognizes an utterance condition of an input sound and outputs a result of the speech recognition. The history storage section 602 stores information of whether an input picture corresponding to the sound recognized by the speech recognition section 601 has been coded and transmitted to the reception side. Initially, the history storage section 602 is put into a condition wherein it has the Information that no input picture has been coded and transmitted. The determination section 603 receives the result of speech recognition of the speech recognition section 601, refers to the stored information of the history storage section 602 to determine whether or not an input picture corresponding to the result of speech recognition has been transmitted to the reception side, and does not generate a control signal if the input picture has been transmitted already. Then, the determination section 603 updates the stored information of the history storage section 602 so that the history storage section 602 has the information that the input picture of the recognized sound has been transmitted. The result of speech recognition is outputted to the picture memory 104 and is thereafter used as an identifier for the registered picture. Here, the refreshing section 604 generates a refresh signal when a particular event occurs. The history storage section 602 initializes, upon reception of such refresh signal, the stored information thereof into a condition wherein it has the information that no input picture has been coded and transmitted. Therefore, after a refresh signal is generated, a new picture is transmitted.

It is to be noted that, when it is intended to refresh the history storage section 602 after each fixed interval of time, the refreshing section 604 may include a timer to generate a refresh signal at a fixed period.

Figure 7:
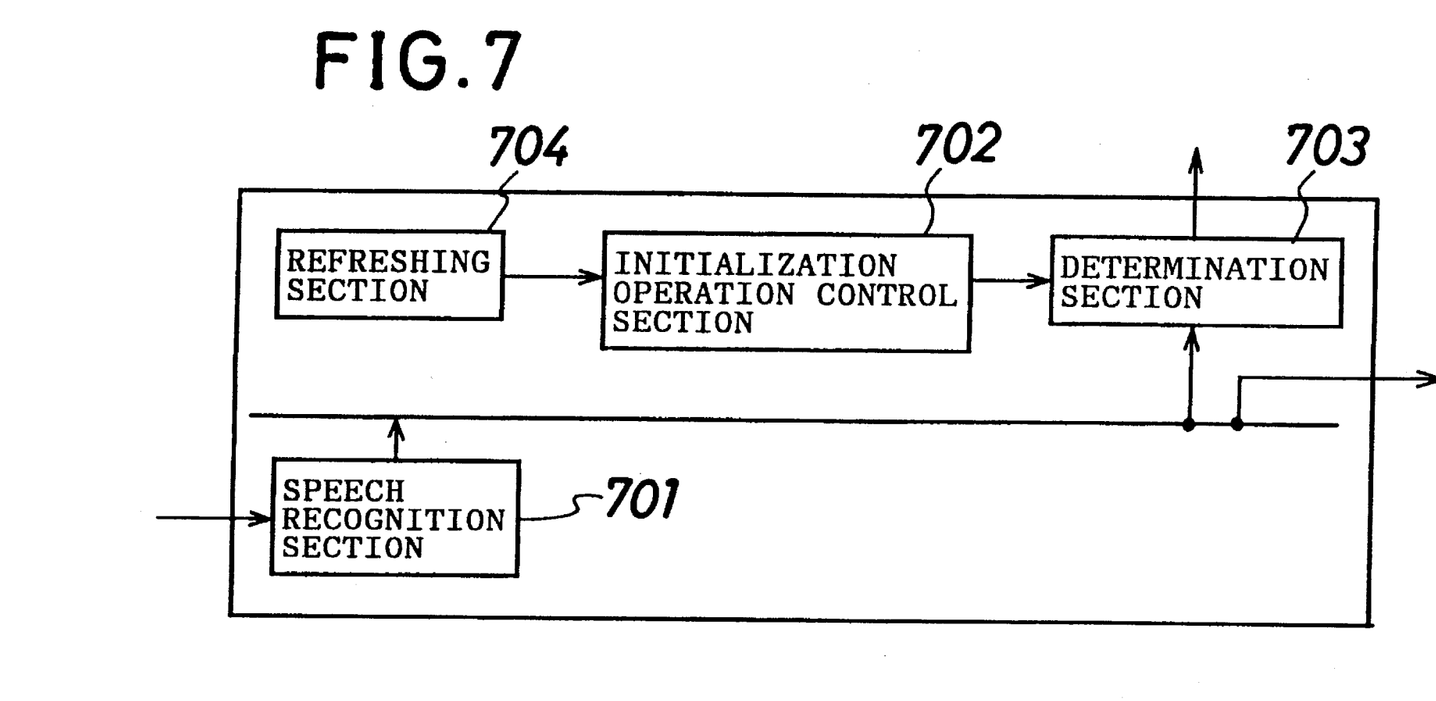

FIG. 7 shows a further different construction of the speech analysis section 101. Referring to FIG. 7, an initialization operation control section 702 successively instructs utterance of sounds to be registered. A speech recognition section 701 thus analyzes an input sound inputted in response to each instruction to recognize an utterance condition and outputs a result of the speech recognition. Then, it is determined by a determination section 703 whether or not the thus recognized sound is a sound to be registered. If the determination proves that the recognized sound is to be registered, the determination section 703 generates a control signal to transmit a corresponding input picture. The result of the speech recognition is outputted to the picture memory 104 on the reception side so that it is thereafter used as an identifier of a registered picture. Then, registration of a next sound is repeated until after there remains no sound to be registered any more.

Here, a refreshing section 704 generates a refresh signal when a particular event occurs. Upon reception of the refresh signal, the history storage section 702 performs the initialization operation described above again from the very beginning. Therefore, after a refresh signal is generated, a new picture is transmitted.

For the initialization operation, an initialization signal may be generated each time a significant variation is detected from the result of speech analysis. For example, the speech analysis section 101 may make, in addition to identification of a condition of a sound to be recognized, an analysis of an analysis parameter peculiar to a speaker and generate an initialization signal when it is detected as a result of a speech analysis during communication that the analysis parameter peculiar to the speaker has a significant variation due to switching of the speaker during communication. A construction of the refreshing section 604 in this instance is shown in FIG. 8.

Figure 8:
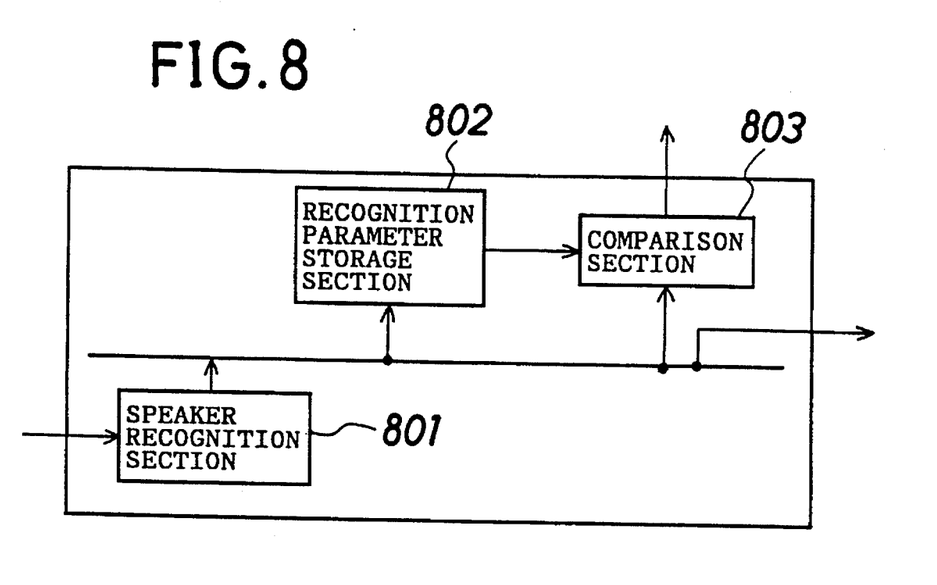
FIG. 8 is a block diagram showing a construction of a refreshing section in the speech analysis sections of FIGS. 6 and 7.

Referring to FIG. 8, the refreshing section 604 shown includes a speaker recognition section 801, a recognition parameter storage section 802 and a comparison section 803. The speaker recognition section 801 first recognizes a speaker from input speech and stores a parameter peculiar to the speaker into the recognition parameter storage section 802. Simultaneously, the thus recognized parameter is compared with a last recognized parameter by the comparison section 803, and when it is detected that the speaker has switched, the comparison section 803 generates a refresh signal.

For the method for such speaker recognition, a method discussed in the chapter 9, "Speaker Recognition" of "Digital Speech Processing", the Publishing Society of Tokai University, 1985, pp. 193–206.

Figure 2:
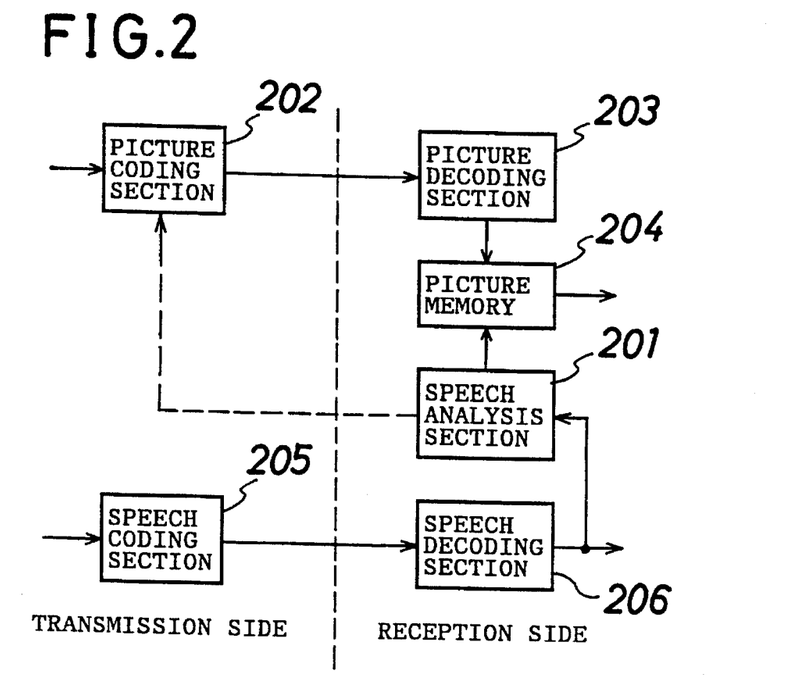
FIG. 2 is a block diagram of another speech and moving picture coding and decoding system showing a second preferred embodiment of the present invention.

Referring now to FIG. 2, there is shown a speech and moving picture coding and decoding system according to a second preferred embodiment of the present invention. The speech and moving picture coding and decoding system of the second embodiment is different from the speech and moving picture coding and decoding system of the first embodiment in that an analysis of speech is performed on the reception side. In particular, the speech and moving picture coding and decoding system of the present embodiment includes a transmission side apparatus which includes a picture coding section 202 for coding an input picture, receiving a control signal from the reception side and outputting coded picture data to the reception side in response to the control signal, and a speech coding section 205 for coding input speech and outputting coded speech data to the reception side. The speech and moving picture coding and decoding system further includes a reception side apparatus which includes a picture decoding section 203 for receiving and decoding coded picture data, a picture memory 204 for storing pictures decoded by the picture decoding section 203 and selectively outputting one of the stored pictures in response to a result of speech recognition, a speech decoding section 206 for receiving and decoding coded picture data, and a speech analysis section 201 for analyzing a decoded picture to recognize presence or absence of an uttered sound or any of the five vowels of the Japanese language, outputting a result of the recognition and outputting a control signal for controlling operation of the picture coding section 202 on the transmission side.

The speech analysis section 201 on the reception side may have such a construction as shown in FIG. 4 similarly to the speech analysis section 101 on the transmission side shown in FIG. 1. However, the speech analysis section 201 on the reception side is different from the speech analysis section 101 on the transmission side in that it analyzes a decoded sound decoded by the speech decoding section 206 and the history storage section 402 stores reception history information.

The speech and moving picture coding and decoding system of the second embodiment operates in the following manner.

Speech inputted on the transmission side is coded by the speech coding section 205, from which coded data are outputted to the reception side.

On the reception side, the coded speech data are received and decoded by the speech decoding section 206, from which decoded speech is outputted. Further, the speech analysis section 201 recognizes presence or absence of utterance of a sound and further recognizes, when presence of utterance of a sound is recognized, which one of the five vowels the vowel of the uttered sound is. If it is recognized that a picture corresponding to the result of recognition has not been received by and stored into the picture memory 204 on the reception side as yet, then the speech analysis section 201 generates and transmits a control signal to the transmission side.

An input picture is coded by the picture coding section 202 on the transmission side, and the coded picture data are transmitted to the reception side when the control signal is received from the reception side. Otherwise, the coded picture data are not transmitted.

On the reception side, when the coded picture data are transmitted thereto, they are decoded by the picture decoding section 203 to produce a decoded picture, and the decoded picture is stored into the picture memory 204 as a picture corresponding to the speech inputted simultaneously thereto and recognized as a result of a speech analysis.

Further, in order to obtain a picture output on the reception side, a picture corresponding to the received result of speech recognition is selected from within the pictures stored in the picture memory 204 and outputted.

Also in the speech and moving picture coding and decoding system of the second system, the speech analysis section 201 on the reception side may have any of such constructions as shown in FIGS. 5 to 7.

Figure 3:
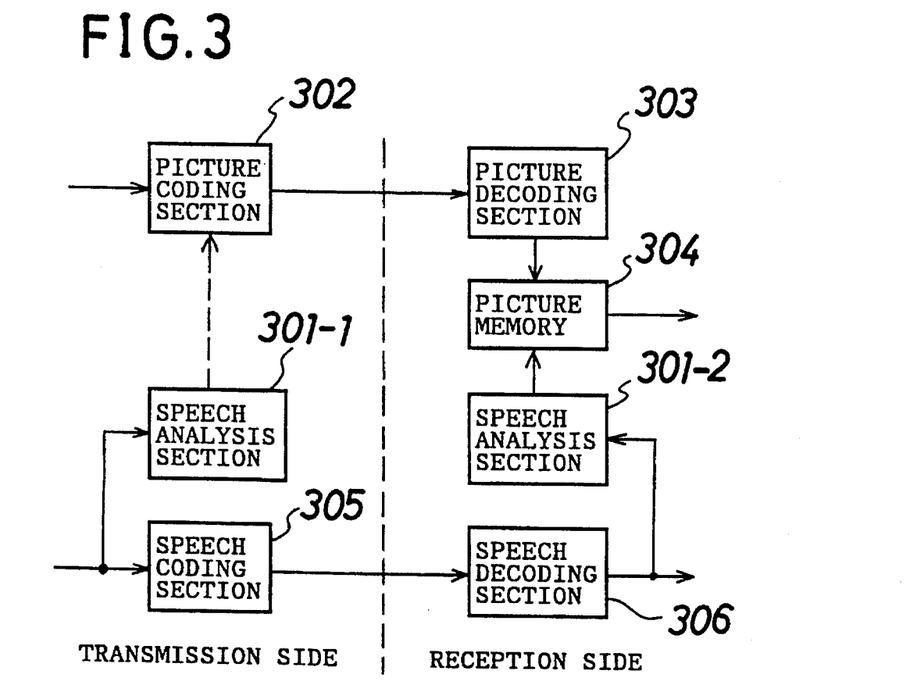
FIG. 3 is a block diagram of a further speech and moving picture coding and decoding system showing a third preferred embodiment of the present invention.

Referring now to FIG. 3, there is shown a speech and moving picture coding and decoding system according to a third preferred embodiment of the present invention. The speech and moving picture coding and decoding system of the present embodiment is different from the speech and moving picture coding and decoding systems of the first and second embodiments described hereinabove in that a speech analysis section is provided on both of the reception side and the transmission side. In particular, in the speech and moving picture coding and decoding system of the present embodiment, a transmission side apparatus includes a transmission side speech analysis section 301-1 for analyzing input speech and generating a control signal when coded data of an input picture corresponding to a result of the speech recognition have not been transmitted to the reception side as yet, a picture coding section 302 for coding an input picture and outputting, when a control signal is received, coded picture data to the reception side, and a speech coding section 305 for coding input speech and outputting coded speech data to the reception side. Meanwhile, a reception side apparatus includes a picture coding section 303 for receiving coded picture data from the transmission side, a picture memory 304 for storing decoded pictures and selectively outputting one of the stored pictures in response to a result of speech analysis, a speech decoding section 306 for receiving and decoding coded speech data, and a speech analysis section 301-2 for analyzing decoded speech and outputting a result of the recognition.

The transmission side speech analysis section 301-1 may have such a construction as shown in FIG. 4. The speech analysis section 301-1, however, does not output a result of speech recognition. On the other hand, the speech analysis section 301-2 on the reception side does not output a control signal, and accordingly, it does not include the picture memory 304 nor the determination section 403 but only includes the speech recognition section 401. In the speech and moving picture coding and decoding system of the present embodiment, the function of the speech analysis section described hereinabove in connection with the speech and moving picture coding and decoding system of the first embodiment is achieved by cooperation of the transmission side speech analysis sections 301-1 and 301-2 on both of the transmission side and the reception side.

The speech and moving picture coding and decoding system of the present embodiment operates in the following manner.

Speech inputted on the transmission side is coded by the speech coding section 305, from which coded data are outputted to the reception side. Further, the input speech is inputted also to the speech analysis section 301-1, by which presence or absence of utterance of a sound is recognized. When presence of utterance of a sound is recognized, the speech analysis section 301-1 recognizes which one of the five vowels the vowel of the uttered sound is, and if a picture corresponding to a result of the recognition has not been transmitted and stored into the picture memory 304 on the reception side as yet, then the speech analysis section 301-1 generates a control signal. An input picture is coded by the picture coding section 302, and the coded picture data are transmitted from the speech analysis section 301-1 to the reception side only when a control signal is received, but otherwise, the coded picture data are not transmitted.

On the reception side, the coded speech data are received first and decoded by the speech decoding section 306, from which speech is outputted. The output speech is supplied to the speech analysis section 301-2, by which presence or absence of utterance of a sound is recognized and, when presence of utterance of a sound is detected, it is recognized which one of the vowels the vowel of the uttered sound is. When coded picture data are transmitted to the reception side, they are decoded by the picture coding section 303 to produce a decoded picture. The decoded picture is stored into the picture memory 304 as a picture of the sound recognized as a result of a speech analysis conducted on the reception side.

On the other hand, in order to obtain a picture output on the reception side, a picture corresponding to a result of speech recognition supplied thereto from the speech analysis section 301-2 is selected from within the pictures stored in the picture memory 304 and outputted.

It is to be noted that, in order to construct the transmission apparatus similarly to the reception apparatus, a speech decoding section may be prepared also in the transmission side to produce locally decoded speech to be used as an input for a speech analysis on the transmission side.

Also in the speech and moving picture coding and decoding system of the present embodiment, the speech analysis section 301-1 on the transmission side and the speech analysis section 301-2 on the reception side can be constructed in such a manner as shown in FIG. 5, 6 or 7. However, since the speech analysis section 301-1 on the transmission side does not output a result of speech recognition and the speech analysis section 301-2 on the reception side does not output a control signal as described above, where the construction of FIG. 5 is adopted as the speech analysis section 301-1 on the transmission side, the reception side speech analysis section 301-2 is constituted only from the speech recognition section 501. Similarly, also where the construction of FIG. 6 is adopted, the reception side speech analysis section 301-2 is constructed only from the speech recognition section 601, and also where the construction of FIG. 7 is adopted, the reception side speech analysis section 301-2 is constituted only from the speech recognition section 701.

It is to be noted that, in the speech and moving picture coding and decoding systems of the three embodiments described above, when a picture which has not been stored into the picture memory as yet is transmitted, the display timing of an output picture is delayed with respect to the output timing of speech on the reception side depending upon a limitation in transmission rate or a processing capacity for coding and decoding of a picture. In this instance, coded picture data are transmitted within the range of a determined transfer rate, and a picture output during such transmission is displayed by such a method that a most resembling picture from within the stored pictures is displayed or the last picture is displayed in a still condition or else, while picture data limited within the range within which they can be processed without a delay are transmitted, coded data are gradually added to a display of a picture of a lower resolution to raise the resolution of a picture to be displayed subsequently.

Further, while, in the speech and moving picture coding and decoding systems of the embodiments described above, the five vowels of the Japanese language are recognized and picture data when the sounds are uttered are stored and displayed, according to the present invention, also a system which only recognizes presence or absence of utterance of a voiced sound or a system which recognizes phonemes including vowels and consonants can be constructed.

Further, picture data may be data of any of a still picture or a moving picture, and the frame rate or the length of moving pictures may be arbitrary. Where the number of frames of pictures is not sufficient, same data may be displayed repetitively. Or when the number of frames of pictures is excessively great, those frames to be displayed may be sampled out.

Further, as a different displaying manner, the displaying rate may be varied or data may be repetitively displayed partly in a reverse order.

Furthermore, when a picture is stored, picture data may be stored in the form of coded data but not in the form of picture data themselves. In this instance, necessary data are recalled after they are decoded.

Further, picture data may be distributed in advance by way of a different route. In this instance, the picture coding section, the picture decoding section and the communication line for coded picture data in the embodiments described are not necessary.

Having now fully described the Invention, will be apparent to one of ordinary skill in the art that many changes and modifications can be made thereto without departing from the spirit and scope of the invention as set forth herein.

What is claimed is:

1. A system for coding and decoding a moving picture based on a result of a speech analysis, the system comprising:

a transmission side apparatus for coding speech and a picture and transmitting the coded speech and coded picture; and a reception side apparatus for receiving and decoding the coded speech and the coded picture from said transmission side apparatus;

said transmission side apparatus including speech coding means for coding and outputting input speech into and as coded speech data to said reception side apparatus, speech recognition means for analyzing the input speech to recognize the input speech as a predetermined number of utterance conditions in expressed in units of phonemes and outputting a result of the speech recognition, picture coding means for coding and outputting input pictures corresponding to the predetermined number of utterance conditions into and as coded picture data, history storage means for storing transmission history information of the coded picture data transmitted from said picture coding means to said reception side apparatus, and determination means for referring to said history storage means to determine whether or not the coded picture data corresponding to the result of the speech recognition has been transmitted to said reception side apparatus and controlling said picture coding means in accordance with a result of the determination;

said reception side apparatus including speech decoding means for decoding the coded speech data received from said transmission side apparatus into decoded speech and outputting the decoded speech, picture decoding means for receiving and decoding the coded picture data into a decoded picture and for outputting the decoded picture, and picture storage means for cumulatively storing the decoded picture decoded by said picture decoding means and selectively outputting, when the result of the speech recognition is received, one of the decoded pictures stored therein which corresponds to the result of the speech recognition.

2. A system for coding and decoding a moving picture as claimed in claim 1, wherein said transmission side apparatus further includes refreshing means for initializing said history storage means.

3. A system for coding and decoding a moving picture as claimed in claim 2, wherein said refreshing means includes a speaker recognition section for recognizing a speaker from the input signal, a recognition parameter storage section for storing a parameter peculiar to the speaker recognized by said speaker recognition section, and a comparison section for comparing the recognized parameter stored in said recognition parameter storage section with another recognized parameter recognized newly by said speaker recognition section and outputting, when the comparison reveals a difference, a refresh signal.

4. A system for coding and decoding a moving picture based on a result of a speech analysis, comprising:

a transmission side apparatus for coding speech and a picture and transmitting the coded speech and coded picture; and a reception side apparatus for receiving and decoding the coded speech and the coded picture from said transmission side apparatus;

said transmission side apparatus including speech coding means for coding and outputting input speech into and as coded speech data to said reception side apparatus, initializing operation control means for successively instructing utterances of sound to be registered, speech recognition means for analyzing an input sound inputted in response to each instruction to recognize an utterance condition in units of a phoneme and outputting a result of the speech recognition, determination means for determining whether or not the thus recognized sound is a sound to be registered, and speech coding means for coding input pictures corresponding to those sounds determined to be registered as results of the speech recognition by said determination means and outputting the coded input pictures as coded picture data;

said reception side apparatus including speech decoding means for decoding the coded speech data received from said transmission side apparatus into decoded speech and outputting the decoded speech, picture decoding means for receiving and decoding the coded picture data into decoded pictures and outputting the decoded pictures, and picture storage means for storing the decoded pictures decoded by said picture decoding means and selectively outputting, when the result of the speech recognition is received, one of the stored decoded pictures which corresponds to the result of the speech recognition.

5. A system for coding and decoding a moving picture based on a result of a speech analysis, comprising:

a transmission side apparatus for coding speech and a picture and transmitting the coded speech and coded picture; and a reception side apparatus for receiving and decoding the coded speech and the coded picture from said transmission side apparatus; said transmission side apparatus including speech coding means for coding and outputting input speech into and as coded speech data to said reception side apparatus, and picture coding means for coding an input picture to obtain coded picture data and outputting the coded picture data to said reception side apparatus when a control signal is received from said reception side apparatus;

said reception side apparatus including picture decoding means for receiving and decoding the coded picture data into a decoded picture and outputting the decoded picture, speech decoding means for decoding the coded speech data into decoded speech and outputting the decoded speech, speech recognition means for analyzing the decoded speech from said speech decoding means to recognize the decoded speech among a predetermined number of utterance conditions expressed in units of phonemes and outputting results of the speech recognition, history storage means for storing reception history information of the coded picture data corresponding to the predetermined number of utterance conditions, determination means for referring to said history storage means to determine whether or not coded picture data corresponding to the result of the speech recognition has been received by said reception side apparatus and outputting a control signal to said picture coding means of said transmission side apparatus in accordance with a result of the determination, and picture storage means for storing decoded pictures decoded by said picture decoding means and selectively outputting one of the stored decoded pictures corresponding to the result of the speech recognition when the result of the speech recognition is received from said speech recognition means.

6. A system for coding and decoding a moving picture as claimed in claim 5, wherein said reception side apparatus includes refreshing means for initializing said history storage means.

7. A system for coding and decoding a moving picture as claimed in claim 6, wherein said refreshing means includes a speaker recognition section for recognizing a speaker from the input signal, a recognition parameter storage section for storing a parameter peculiar to the speaker recognized by said speaker recognition section, and a comparison section for comparing the recognized parameter stored in said recognition parameter storage section with another recognized parameter recognized newly by said speaker recognition section and outputting, when the comparison reveals a difference, a refresh signal.

8. A system for coding and decoding a moving picture based on a result of a speech analysis, comprising:

a transmission side apparatus for coding speech and a picture and transmitting the coded speech and coded picture; and a reception side apparatus for receiving and decoding the coded speech and the coded picture from said transmission side apparatus;

said transmission side apparatus including speech coding means for coding and outputting input speech into and as coded speech data to said reception side apparatus, transmission side speech recognition means for analyzing the input speech to recognize the input speech among a predetermined number of utterance conditions expressed in units of phonemes and outputting results of the speech recognition, and picture coding means for coding and outputting input pictures corresponding to the predetermined number of utterance conditions into and as coded picture data;

said reception side apparatus including picture decoding means for receiving and decoding the coded picture data into decoded pictures and outputting the decoded pictures, speech decoding means for decoding the coded speech data received from said transmission side apparatus into decoded speech and outputting the decoded speech, reception side speech recognition means for analyzing the decoded speech from said speech decoding means to recognize the decoded speech among a predetermined number of utterance conditions in units of a phoneme and outputting a result of the speech recognition, and picture storage means for storing the decoded pictures from said picture decoding means corresponding to the predetermined number of utterance conditions and selectively outputting one of the stored decoded pictures corresponding to the result of the speech recognition when the result of the speech recognition is received from said reception side speech recognition means.

\* \* \* \* \*